United States Patent
Tanaka et al.

(10) Patent No.: US 6,899,533 B2
(45) Date of Patent: May 31, 2005

(54) APPARATUS FOR MAKING SEMICONDUCTOR DEVICE

(75) Inventors: Yasuo Tanaka, Tokyo (JP); Jiro Matsumoto, Saitama (JP)

(73) Assignees: Casio Computer Co., Ltd., Tokyo (JP); Oki Electric Industry Co., Ltd., Tokyo (JP)

( * ) Notice: Subject to any disclaimer, the term of this patent is extended or adjusted under 35 U.S.C. 154(b) by 251 days.

(21) Appl. No.: 10/093,397

(22) Filed: Mar. 11, 2002

(65) Prior Publication Data

US 2002/0142058 A1 Oct. 3, 2002

(30) Foreign Application Priority Data

Apr. 2, 2001 (JP) ........................................ 2001-103272

(51) Int. Cl.[7] .......................... B29C 45/02; B29C 45/14; B29C 70/72
(52) U.S. Cl. ...................... 425/116; 425/125; 425/127; 425/129.1; 425/215; 425/216; 425/544
(58) Field of Search ................................. 425/116, 125, 425/127, 129.1, 215, 544, 216

(56) References Cited

U.S. PATENT DOCUMENTS

| | | | | |
|---|---|---|---|---|
| 4,799,534 A | * | 1/1989 | Ueno et al. ................. | 425/562 |
| 5,204,127 A | * | 4/1993 | Prusha ........................ | 425/544 |
| 5,326,243 A | * | 7/1994 | Fierkens ..................... | 425/116 |
| 5,676,896 A | * | 10/1997 | Izumida et al. ............. | 425/127 |
| 6,106,274 A | * | 8/2000 | Ritchie et al. .............. | 425/544 |
| 6,264,454 B1 | * | 7/2001 | Hale ........................... | 425/544 |
| 6,471,501 B1 | * | 10/2002 | Shinma et al. ............. | 425/127 |
| 6,478,562 B1 | * | 11/2002 | Miyajima ................... | 425/215 |

FOREIGN PATENT DOCUMENTS

| | | | | | |
|---|---|---|---|---|---|
| JP | 09082736 A | * | 3/1997 | .......... | B29C/45/02 |
| JP | 10116847 A | * | 5/1998 | .......... | B29C/45/02 |
| JP | 10128805 A | * | 5/1998 | .......... | B29C/45/02 |
| JP | 2001088170 A | * | 4/2001 | .......... | B29C/45/02 |

* cited by examiner

*Primary Examiner*—Robert B. Davis
(74) *Attorney, Agent, or Firm*—Takeuchi & Takeuchi (57) ABSTRACT

A system for manufacturing a semiconductor device, comprises first and second metal molds (100a, 100b) to form a cavity; a pair of plungers (102, 103) provided in cylinder holes (102a, 103b) of the second metal mold (100b); a pressure supplying unit for pushing the plungers (102, 103) under a pressure lower than the injection pressure applied to the plunger (101) to form debris cavities (DC1, DC2) which absorb an excess resin, thereby reducing the height of a projection produced on the enclosing resin layer.

9 Claims, 13 Drawing Sheets

APPARATUS FOR MAKING SEMICONDUCTOR DEVICE

BACKGROUND OF THE INVENTION

1. Field of the Invention

The present invention relates to an apparatus and a process for making a semiconductor device, especially, of the chip-size-package type.

2. Description of the Related Art

Semiconductor devices of the chip-size-package (CSP) type, in which the size of a chip is substantially equal to the size of a package, are will known. FIGS. 10–13 show an example of the wafer-level CSP. Its manufacturing process will be described.

Figure 10:
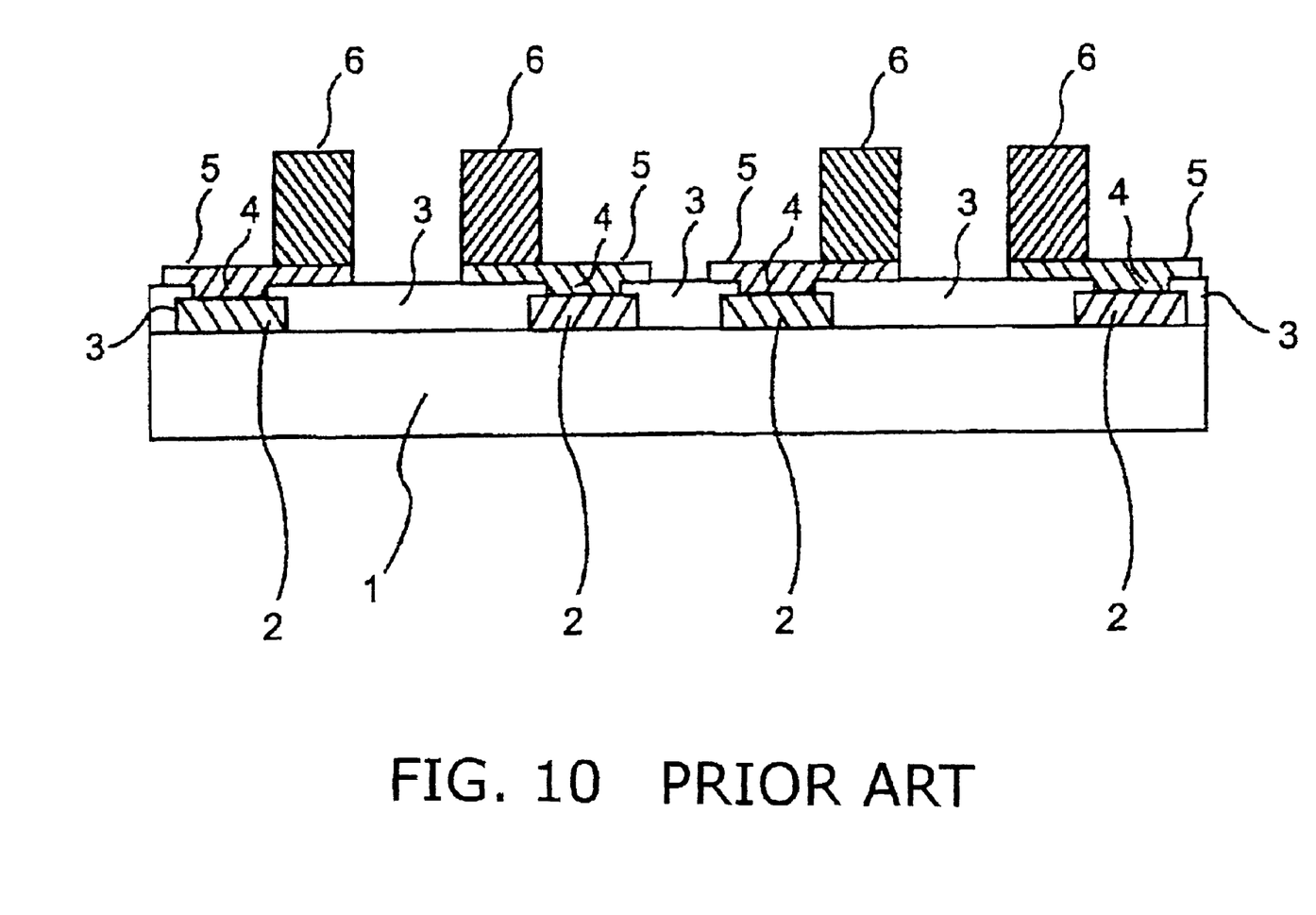
FIGS. 10–13 are sectional views of a semiconductor device in various manufacturing steps.

In FIG. 10, a plurality of connection pads or aluminum electrodes 2 are formed on the circuit surface of a semiconductor or silicon wafer substrate 1, and a surface protection film 3 is formed thereon such that the central areas of the connection pads 2 are exposed. The surface protection film 3 is made by, for example, coating and hardening a polyimide resin over the circuit surface of the semiconductor wafer substrate 1, applying resist patterning and protection film patterning, and removing the resist.

A plurality of rewiring lines 5 are formed on the connection pads 2 through openings 4 of the surface protection film 3. The rewiring lines 5 are made by applying UBM spattering, rewiring resist coating and hardening, and rewiring resist patterning, and electrolytic plating to the areas opened by the resist.

A plurality of posts or cylindrical electrodes 6 are provided at predetermined positions on the rewiring lines 5. The posts 6 are made by, for example, coating and hardening a post forming resist at a thickness of 100 to 150 um for resist patterning and applying electrolytic plating to the opened areas. Then, the post forming resist is removed while the UBM deposited on the undesired area is removed by etching.

Figure 11:
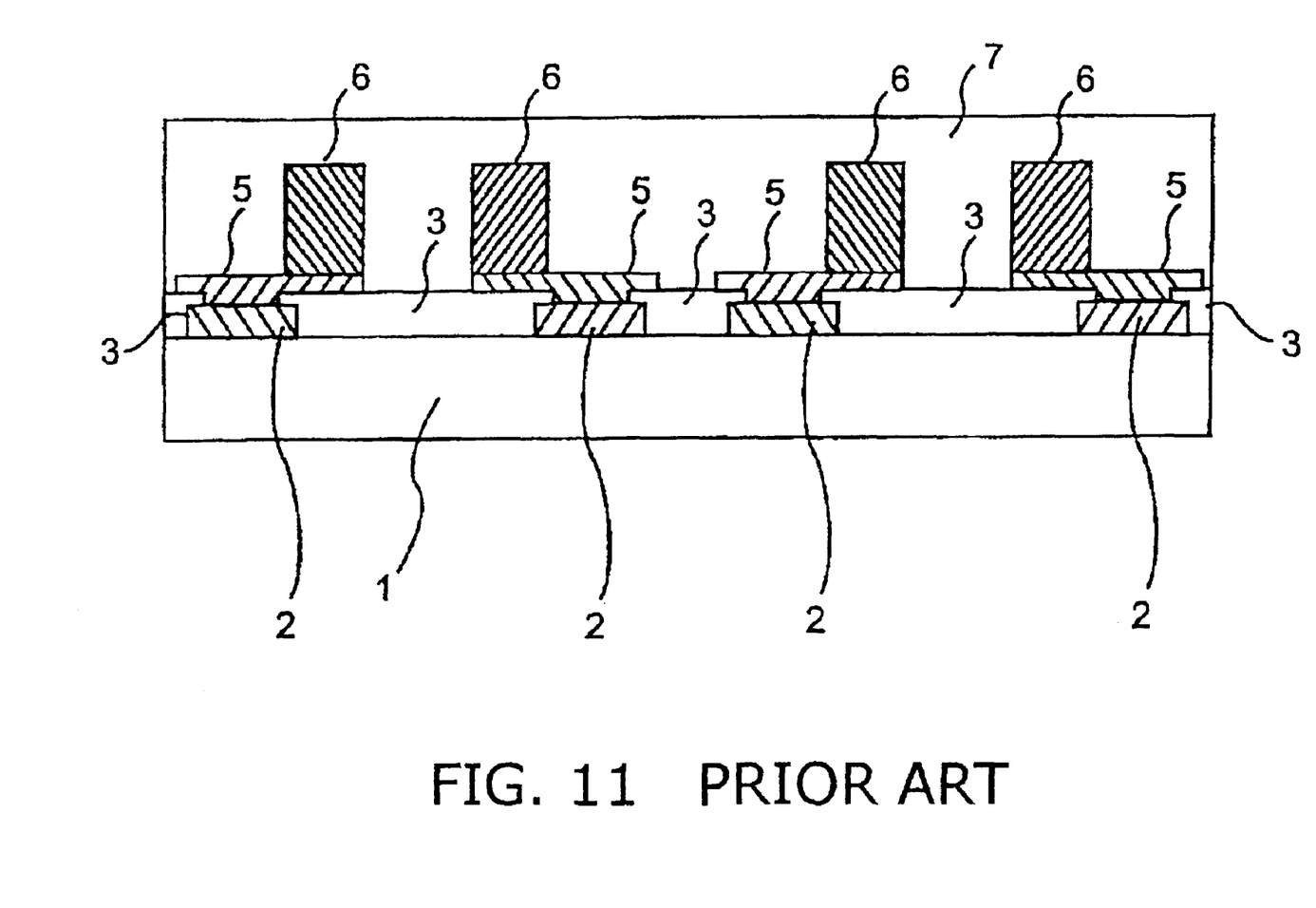
Figure 12:
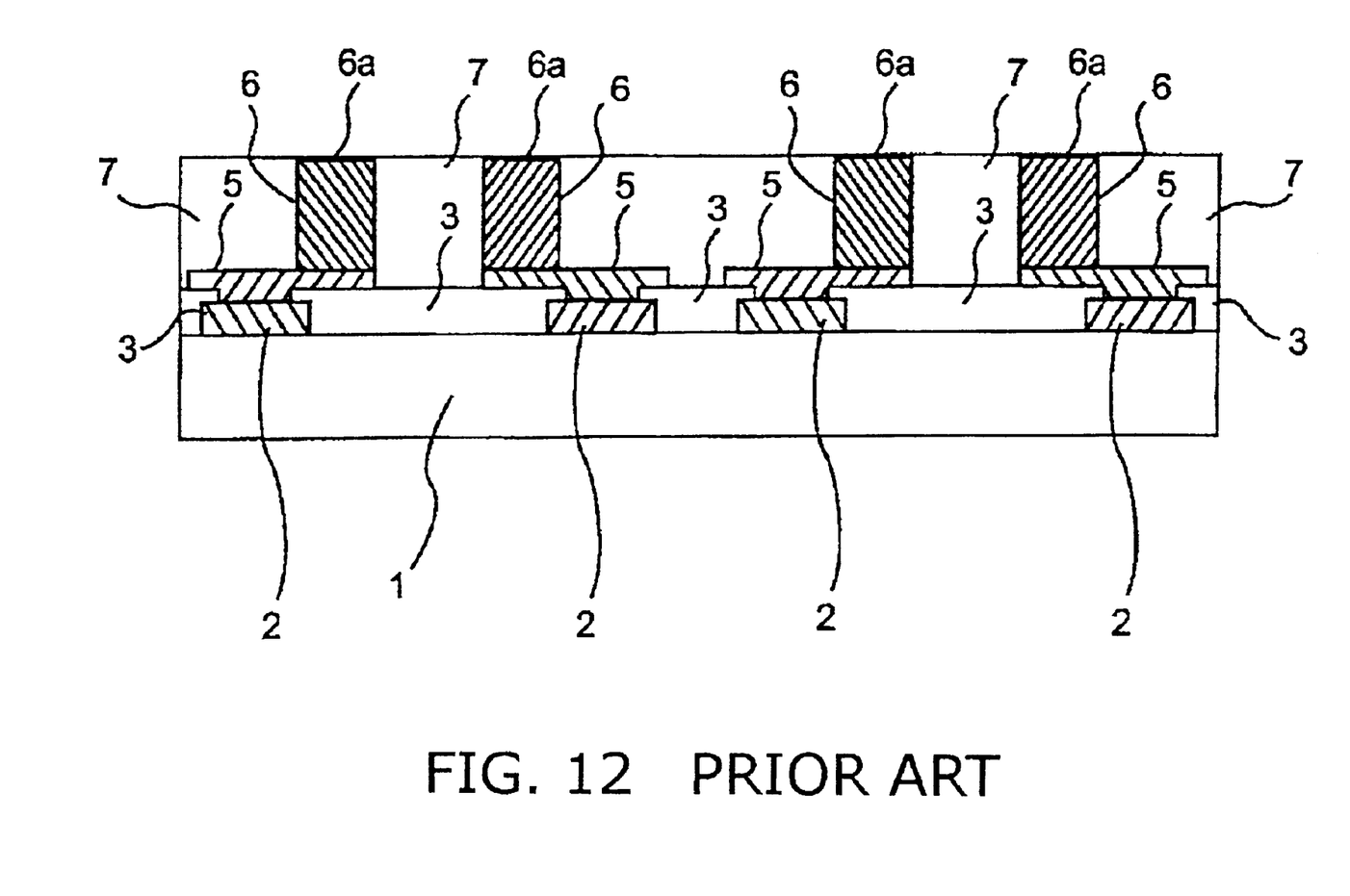

In FIG. 11, a resin, such as epoxy, is molded over the circuit surface of the semiconductor wafer substrate 1 to form an enclosing resin layer 7. After the enclosing resin is hardened, the semiconductor wafer substrate 1 is placed on a grinding table for polishing the upper surface of the enclosing resin layer 7 to expose the end faces 6a of the posts 6 (see FIG. 12). Then, the oxide film is removed from the surface, and the surface is metallized by solder printing.

Figure 13:
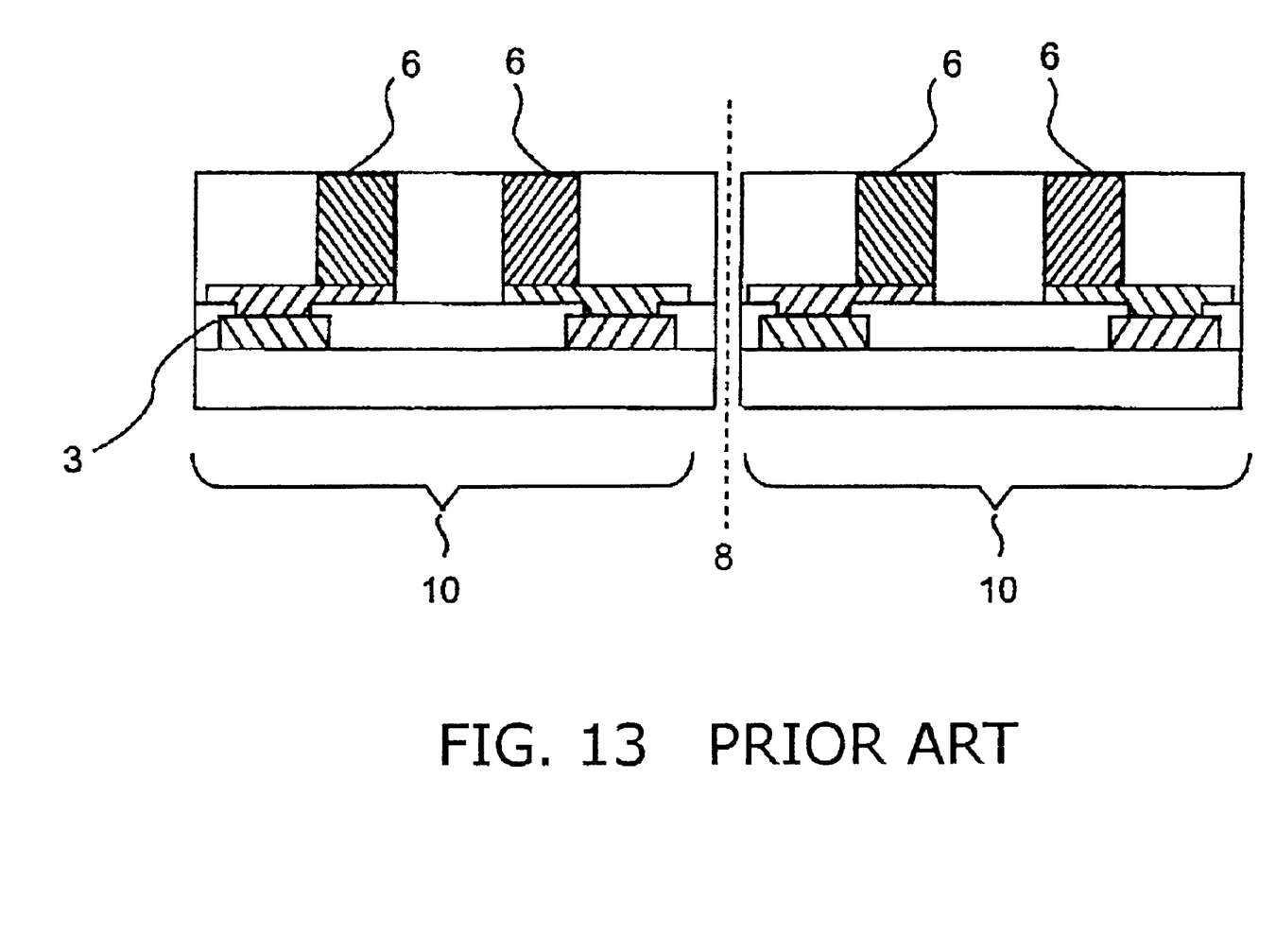

Then, the back side of the semiconductor wafer substrate 1 is ground to a predetermined thickness, and the model and lot Nos. are marked on the back side. The semiconductor wafer substrate 1 is placed on a dicing tape provided on a dicing frame. As shown in FIG. 13, the semiconductor wafer substrate 1 is diced along a cutting line 8 to provide individual chips or semiconductor devices 10.

Figure 14:
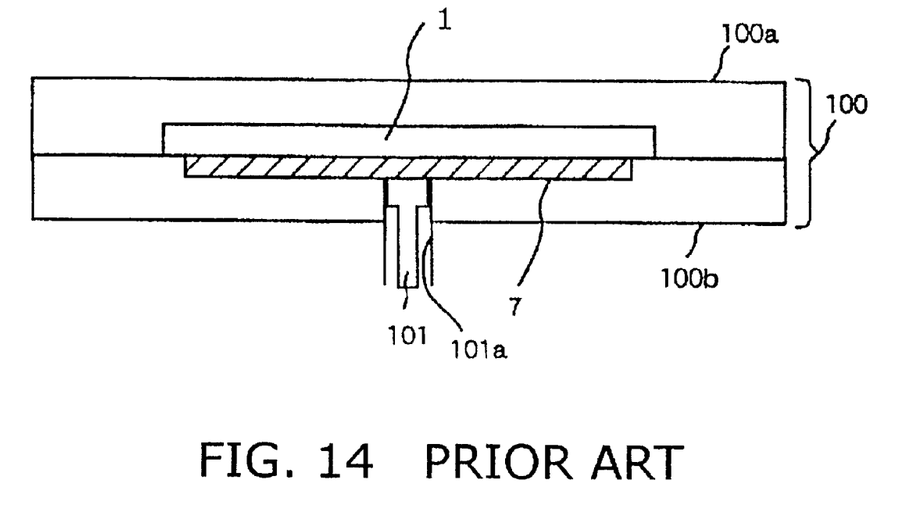
FIG. 14 is a sectional view of a conventional enclosing resin forming apparatus.

The enclosing resin layer 7 of the wafer-level CSP semiconductor devices 10 is made by, for example, transfer-molding using such a metal mold 100 as shown in FIG. 14. This resin enclosing apparatus comprises a first metal mold 100a on which the semiconductor wafer substrate 1 is placed and a second metal mold 100b having a cavity opposed to the circuit surface of the semiconductor wafer substrate 1. A cylinder hole 101a is provided in the second metal mold 100b to receive a plunger 101.

The enclosing resin layer 7 is made by placing the semiconductor wafer substrate 1 on the first metal mold 100a, closing the second metal mold 100b, filling the cylindrical hole 101a with a predetermined amount of resin, melting the resin, and pushing the plunger 101 under a predetermined pressure to fill the cavity with the molten resin. The plunger 101 is kept under the pressure until the resin is hardened in the cavity and released to provide the enclosing resin layer.

It is necessary to fill the cavity of the second metal mold 100b with the resin evenly. Since the thickness of the semiconductor wafer substrate 1 and the weight of resin tablets vary, it is necessary to use a volume of resin tablets that is larger than the cavity volume. Depending on variations in the tablet weight and the thickness of the semiconductor wafer substrate 1, an excessive resin remaining in the cylindrical hole 101a can form a projection of 3 to 6 mm on the enclosing resin layer 7 that has a thickness of 190 to 220 um.

Such a projection can break the semiconductor wafer substrate 1 or separate the enclosing resin layer 7 from the wafer surface when the metal mold 100 is released. In addition, in the subsequent resin layer grinding step, an additional step for removing the projection by grinding is required, resulting in the reduced through-put of the manufacturing process. Moreover, the local stress produced by grinding the projection can break the semiconductor wafer substrate 1.

SUMMARY OF THE INVENTION

Accordingly, it is an object of the invention to provide an apparatus and process for making a semiconductor device, which is able to eliminate or reduce the height of a projection produced on the enclosing resin layer.

According to an aspect of the invention, there is provided an apparatus for manufacturing a semiconductor device, comprising a metal mold consisting of a first metal mold on which a semiconductor wafer substrate is placed and a second metal mold having a cavity and an enclosing resin forming unit for filling the cavity with a molten resin to form an enclosing resin layer on the semiconductor wafer substrate. The enclosing resin forming unit includes a resin filling section having at least one first plunger provided in the second metal mold for filling the cavity with a molten resin under a predetermined injection pressure and at least one second plunger slidable under a pressure of an excessive resin flown from the cavity.

According to embodiments of the invention, it further comprises a pressure applying unit for applying a pressure to the second plunger which is lower than a pressure applied to the first plunger. The pressure applying unit for supplying the same gauge pressure to both of the first and second plungers, with bore and plunger diameters of the first plunger set larger than those of the second plunger, respectively.

According to another aspect of the invention, there is provided an apparatus for manufacturing a semiconductor device, comprising a metal mold consisting of a first metal mold on which a semiconductor wafer substrate is placed, a second metal mold having a cavity, and a third metal mold and an enclosing resin layer forming unit for filling the cavity with a molten resin to form an enclosing resin layer on the semiconductor wafer substrate. The enclosing resin layer forming means includes at least one first plunger provided in the third metal mold for filling the cavity with a molten resin under a predetermined injection pressure; a surface of the third metal mold being opposed to the semiconductor wafer substrate on the first metal mold; and a sliding unit for making either the first and second metal molds or the third metal mold slidable with respect to the other under a pressure of the molten resin filled in the cavity.

According to other embodiments of the invention, it further comprises a first pressure application means for applying a first pressure higher than a resin pressure of the molten resin to either first and second metal molds or the third metal mold in a first direction opposite to a second direction of the resin pressure and a second pressure application means for applying a second pressure lower than the resin pressure in the second direction. The first pressure application unit comprises a piston to which a pressure higher than the resin pressure is applied. The second pressure application unit comprises a spring having a spring pressure lower than the resin pressure. The first plunger is provided at a position corresponding to a central area of the semiconductor wafer substrate. The semiconductor wafer substrate comprises a plurality of connection pads provided on the circuit surface and a plurality of electrode posts connected to the connection pads.

According to still another aspect of the invention, there is provided a process for making a semiconductor device, comprising the steps of placing a semiconductor wafer substrate in a cavity of a metal mold; filling the cavity with a molten resin to form an enclosing resin layer over a surface of the semiconductor wafer substrate; providing at least one first plunger for filling the molten resin under a predetermined injection pressure and at least one second plunger for receiving an excessive resin flown from the cavity to move backwardly, thereby absorbing the excessive resin.

According to yet another aspect of the invention there is provided a process for making a semiconductor device, comprising the steps of placing a semiconductor wafer substrate in a cavity of a metal mold; filling the cavity with a molten resin under a predetermined injection pressure to form an enclosing resin layer over a surface of the semiconductor wafer substrate; making slidable a surface opposed to the semiconductor wafer substrate such that the surface is slid backwardly by an excessive resin from the cavity to absorb the excessive resin.

The semiconductor wafer substrate may comprise, on a surface thereof, a plurality of connection pads and a plurality of electrode posts connected to the connection pads.

The second plunger absorbs the excessive resin flown from the cavity to reduce the height of a projection produced on the enclosing resin layer. The sliding unit makes slidable a surface opposed to the semiconductor wafer substrate in the cavity under a pressure lower than the injection pressure so that the surface is slid responsive to the molten resin filled in the cavity to absorb the excessive resin, minimizing the height of a projection produced on the enclosing resin layer.

DESCRIPTION OF THE PREFERRED EMBODIMENTS (1) First Embodiment

The resin enclosing apparatus and process according to the first embodiment of the invention will now be described with reference to FIGS. 1–4, wherein the same components as those of FIG. 14 are assigned with like reference numbers and their description will be omitted.

Figure 1:
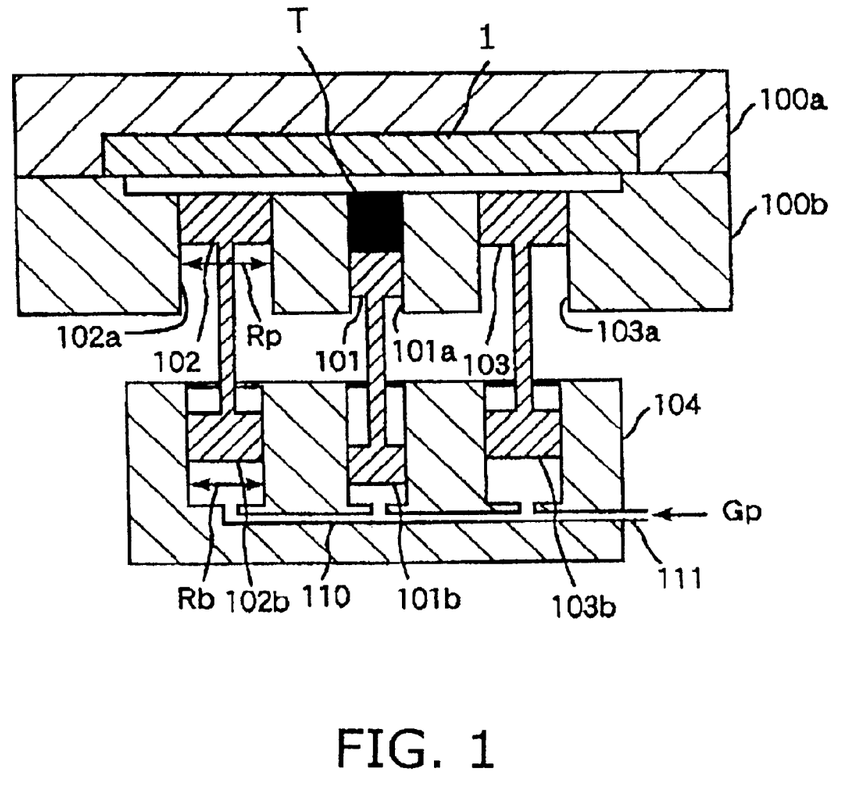
FIGS. 1–3 are sectional views of the first enclosing resin forming apparatus according to an embodiment of the invention.

In FIG. 1, the resin enclosing apparatus comprises a metal mold 100 consisting of a first metal mold 100a on which the semiconductor wafer substrate 1 is placed and a second metal mold 100b having a cavity opposed to the circuit surface of the semiconductor wafer substrate 1. A pair of cylindrical holes 102a and 103a are provided in the second metal mold 100b to receive plungers 102 and 103, respectively, in addition to a cylindrical hole 101a for a plunger 101. As described later, the plungers 102 and 103 absorb the excessive resin when the cavity is filled with a molten resin.

A plunger unit 104 applies an injection pressure to the respective plungers 101–103. The injection pressure to the plungers 102 and 103 is set lower than the injection pressure of the plunger 101. The plunger unit 104 comprises a mechanism for providing the respective plungers with the injection pressure based on the gauge pressure Gp supplied by a hydraulic circuit (not shown), pistons 101b, 102b, and 103b connected to the plungers 101, 102, and 103, respectively, and a hydraulic supply line 110 for supplying the gauge pressure Gp to the base 111 for the respective plungers 101–103.

The bore diameter, Rb, of the plunger 101 is made different from the bore diameter, Rb, of the plungers 102 and 103. Also, the plunger diameter, Rp, of the plunger 101 is made different from the plunger diameter, Rp, of the plungers 102 and 103. In this way, the injection pressure of the plunger 101 is made higher than the injection pressure of the plungers 102 and 103.

For example, let the gauge pressure upon the base of each of the plungers 101–103 be 95 Kg/cm, the bore and plunger diameters of the plunger 101 be 20 and 19 mm, respectively, and the bore and plunger diameters of each of the plungers 102 and 103 be 22 and 25 mm. Since the plunger pressure= the gauge pressure×(the bore diameter/the plunger diameter), the respective injection pressures are 105.3 Kg/cm for the plunger 101 and 73.6 Kg/cm for each of the plungers 102 and 103. That is, the injection pressure of the plungers 102 and 103 becomes lower than the injection pressure of the plunger 101.

The resin forming process comprises placing the semiconductor wafer substrate 1 on the first metal mold 100a, closing the first metal mold 100a and the second metal mold 100b that has a cavity opposed to the circuit surface of the semiconductor wafer substrate 1, and filling a predetermined amount of resin (tablet T) in the cylinder hole of the plunger 101.

Figure 2:
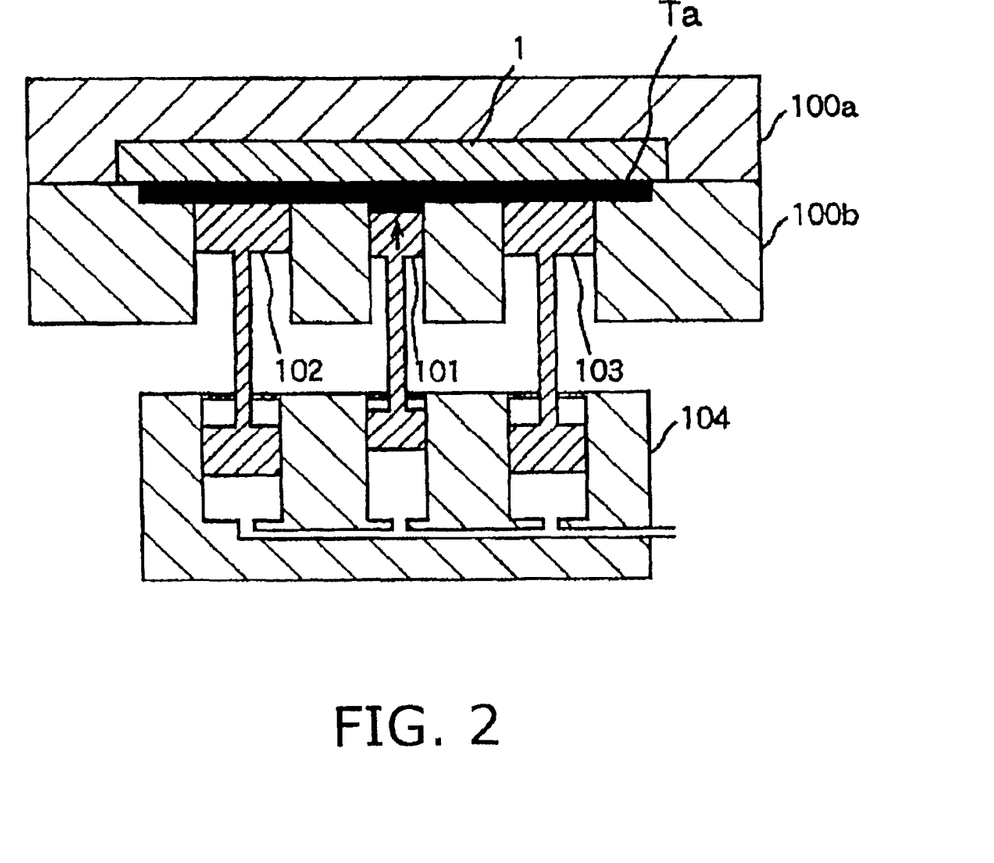

Then, as shown in FIG. 2, the tablet T is molten under heat and the plunger unit 104 supplies the above gauge pressure to the respective plungers 101–103 so that the plunger 101 injects the molten resin Ta into the cavity of the first metal mold at a pressure of 105.3 Kg/cm. It is understood that as shown in FIG. 10, the semiconductor wafer substrate 1 comprises a plurality of connection pads 2 and a plurality of electrode posts 6 connected to the connection pads 2.

Figure 3:
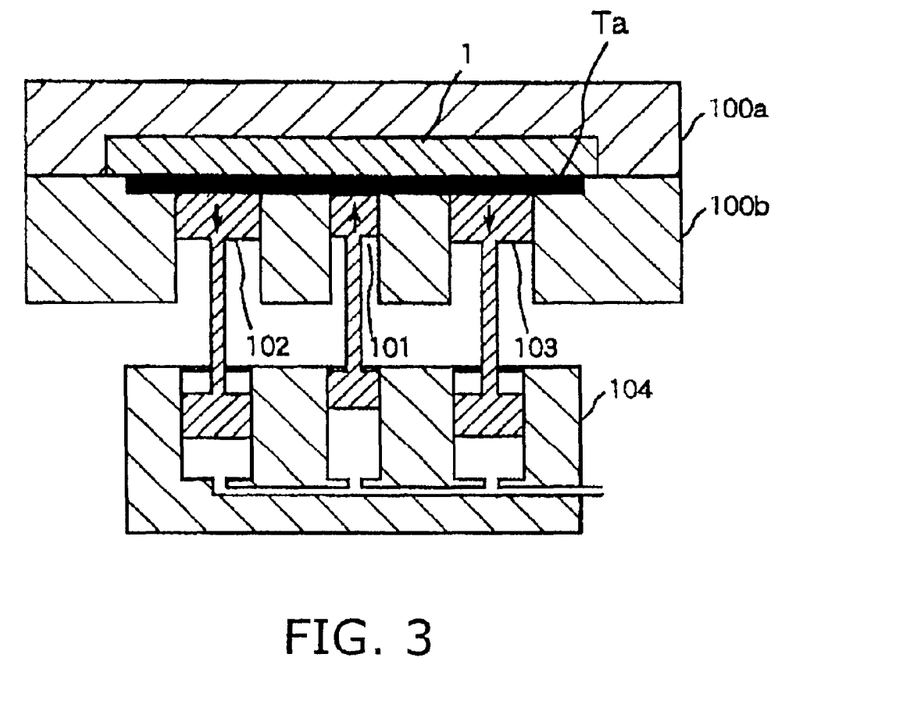
Figure 4:
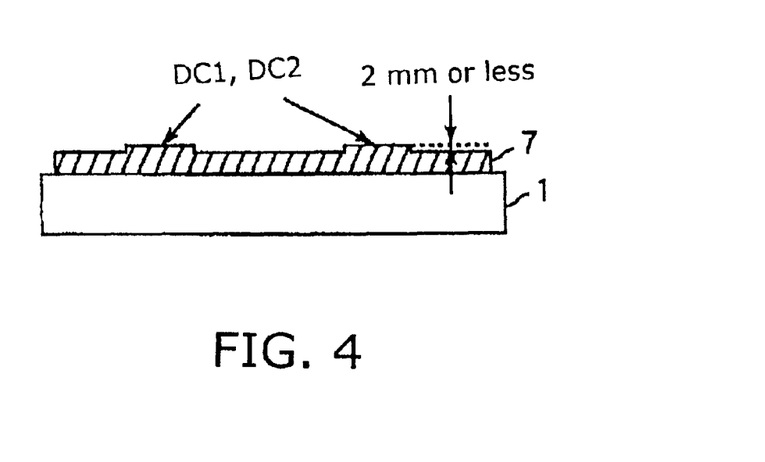
FIG. 4 is a sectional view of an enclosing resin layer produced by the apparatus of FIG. 1.

As shown in FIG. 3, as the molten resin Ta is hardened in the cavity of the second metal mold 100b, the plunger 101 is kept at a pressure of the 105.3 Kg/cm while the plungers 102 and 103 are kept at a pressure of 73.6 Kg/cm so that the plungers 102 and 103 are pushed back downwardly by a pressure difference of 31.7 Kg/cm to form debris cavities DC1 and DC2 into which the excessive resin is absorbed, thereby reducing the height of a projection produced on the enclosing resin layer.

Figure 15:
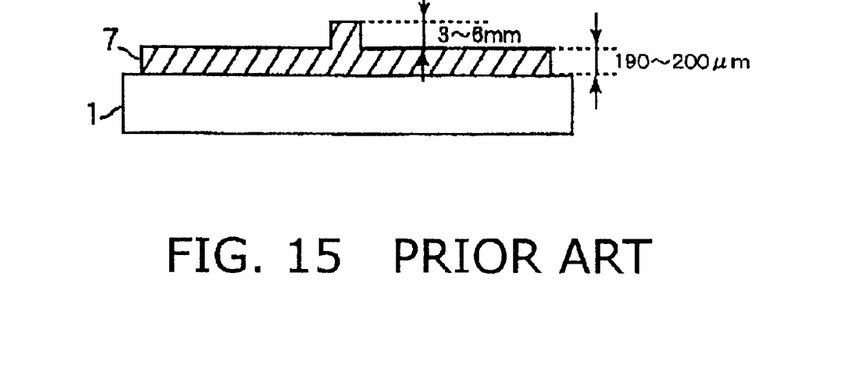
FIG. 15 is a sectional view of an enclosing resin layer produced by the conventional apparatus.

More specifically, the debris cavities DC1 and DC2 reduce the height to 2 mm or less compared with the height of 3–6 mm for the 190–220-um thick enclosing resin layer 7 in FIG. 15.

After the resin is hardened, the semiconductor wafer substrate 1 is removed from the metal mold 100, and the enclosing resin layer is ground to expose the end faces 6a of the posts 6.

Since the height of a projection is reduced, the problem that the semiconductor wafer substrate 1 is broken or the enclosing resin layer comes off is minimized. The projection can be ground together with the enclosing resin layer and the amount of grinding the projection is reduced so that it takes less time in grinding, thus increasing the through-put of the process. Also, the low stress in the grinding minimizes the breakage of the semiconductor wafer substrate 1 during the grinding.

Alternatively, the number of the second plungers biased by the injection pressure lower than that of the first plunger 101 may be one or more than two. In essence, at least one second plunger is provided to form a debris cavity into which the excessive resin dispersed to reduce the height of a projection.

A pressure supplying system may be provided for each of the plungers so that the bore and plunger diameters of each plunger may be set independently. The injection pressure may be generated by an electric motor.

(2) Second Embodiment

Figure 5:
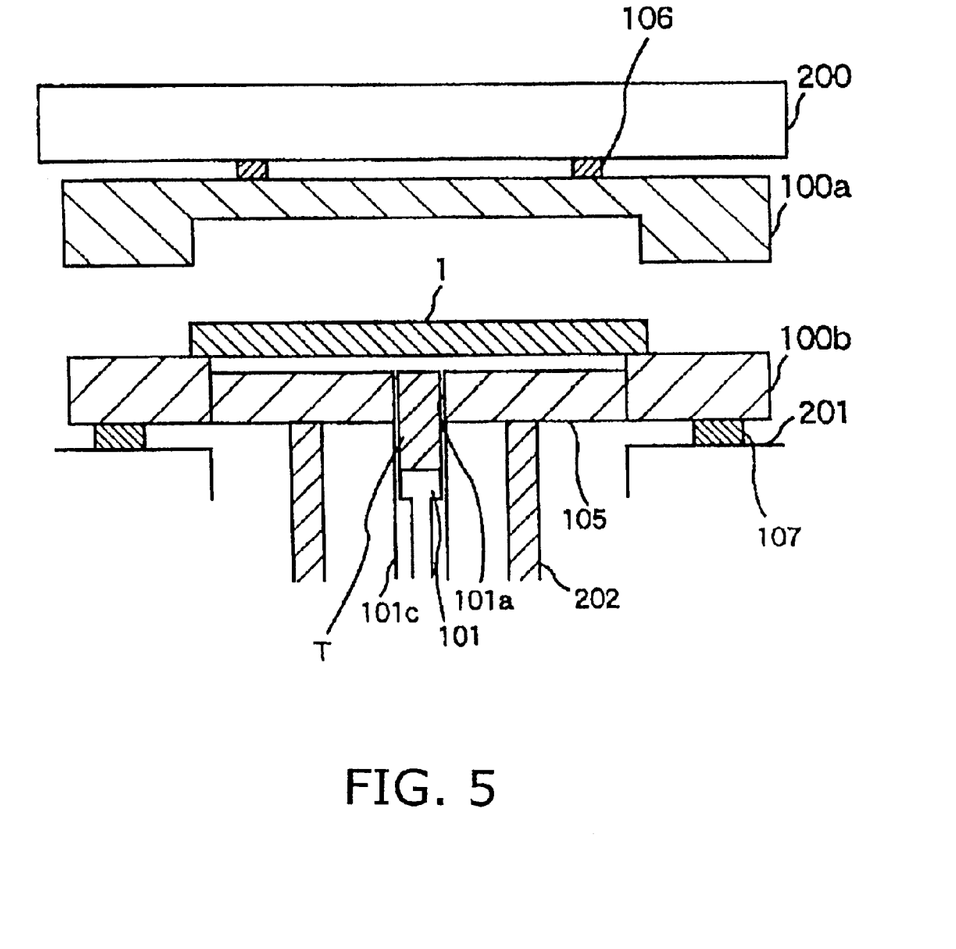
FIGS. 5–9 are sectional views of an enclosing resin forming apparatus according to the second embodiment of the invention.

The second embodiment will be described with reference to FIGS. 5–9. In FIG. 5, the resin enclosing apparatus comprises first, second, and third metal molds 100a, 100b, and 105. The third metal mold 105 has a surface opposed to the semiconductor wafer substrate 1 that is placed in the cavity of the first metal mold 100a. A movable member 200 is connected to the first metal mold 100a via a spring 106 to bias the first metal mold 100a downwardly. The value of the bias is set lower than the pressure upon the first metal mold 100a applied by the resin injected into the cavity by the plunger 101. The second metal mold 100b is connected to a fixed member 201 via a spring 107 for up-and-down movement.

The movable member 200 is moved upwardly or downwardly by a moving mechanism (not shown). A cylinder hole 101a is provided in the third metal mold 105 to receive a cylinder 101c in which a plunger 101 is provided. A piston 202 supports the third metal mold 105 around the cylinder hole 101a so that the first and second metal molds 100a and 100b are provided in an up-and-down sliding relationship with the third metal mold 105.

The piston 202 is supported by a predetermined force produced by a hydraulic or electric motor. The value of the force is set higher than the force, upon the third metal mold 105, of the resin injected into the cavity by the plunger 101, which keeps the third metal mold 105 substantially at the fixed position. For example, if the injection pressure upon the plunger 101 is 100 Kg/cm and the force upon the third metal mold 105 is 30 tons, the force supporting the third metal mold 105 is set 35 tons.

The resin forming process according to the second embodiment is as follows. In FIG. 5, the semiconductor wafer substrate 1 is placed in the second metal mold 100b such that the circuit surface is opposed to the third metal mold 105, and a predetermined amount of resin (tablet T) is filled in the cylinder hole of the plunger 101 that is provided at the position corresponding to the center of the semiconductor wafer substrate 1.

Figure 6:
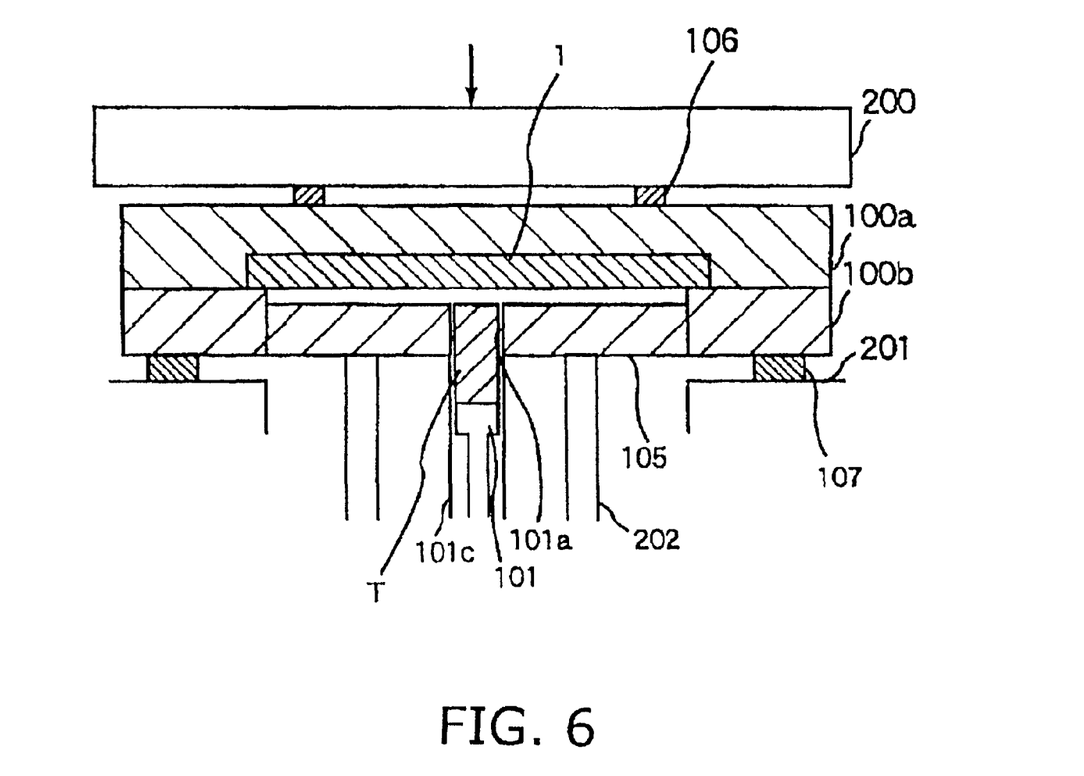

In FIG. 6, the movable member 200 is moved downwardly, with the first metal mold 100a moved downwardly so that the semiconductor wafer substrate 1 on the second metal mold 100b is fits in the first metal mold 100a. Then, the resin (tablet T) in the cylinder hole for the plunger 101 is melted under heat. The movable member 200 is fixed at this position.

Figure 7:
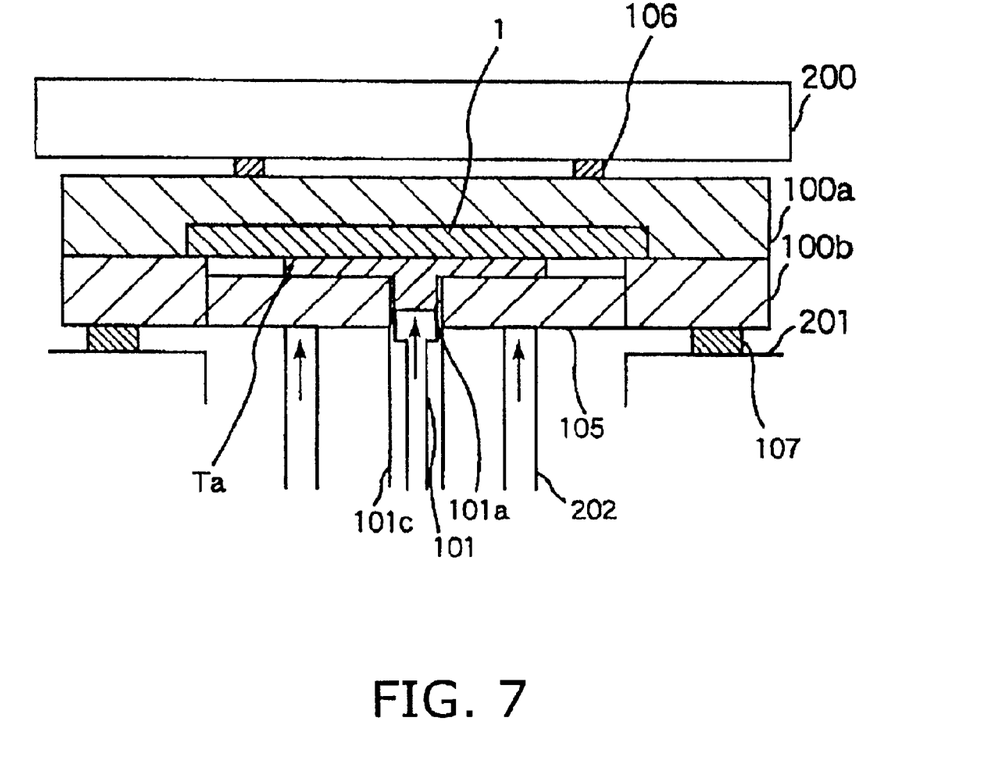

In FIG. 7, the molten resin Ta is injected to the cavity of the second metal mold 100b by the plunger 101. When an excessive resin is injected into the cavity of the second metal mold 100b, the first and third metal molds 100a and 105 receive forces tending to expand the cavity. Since the force by the piston 202 is set higher than the force of the molten resin Ta, the third metal mold 105 is fixed.

By contrast, the force on the first metal mold 100a by the spring 106 is lower than the force of the resin Ta so that the first metal mold 100a is moved upwardly by the force of the resin Ta. The second metal mold 100b, which is biased upwardly by the spring 107, moves together with the first metal mold 100a.

Figure 8:
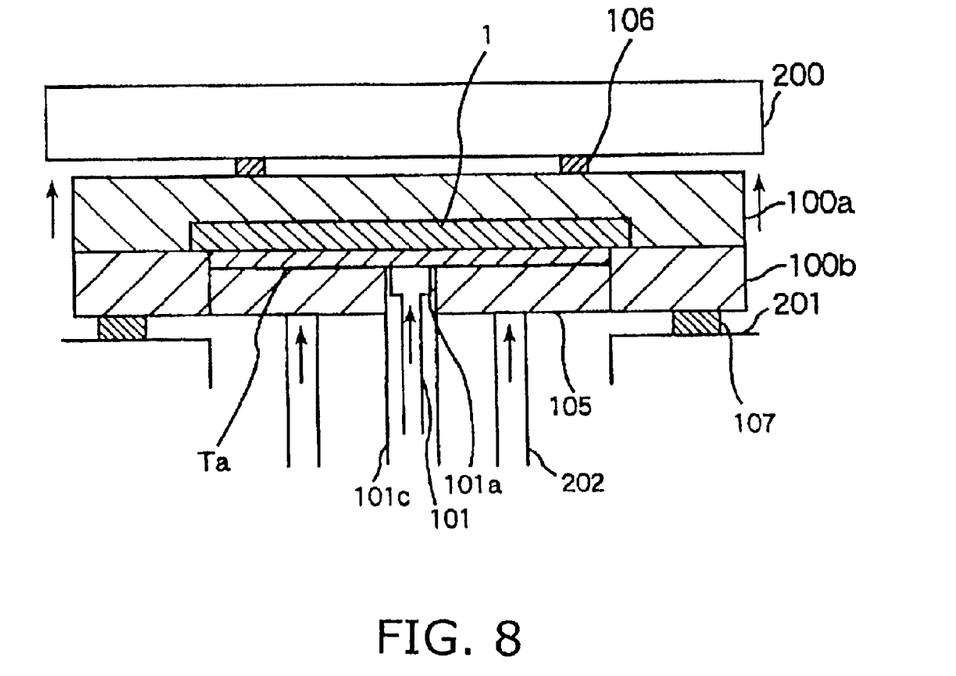
Figure 9:
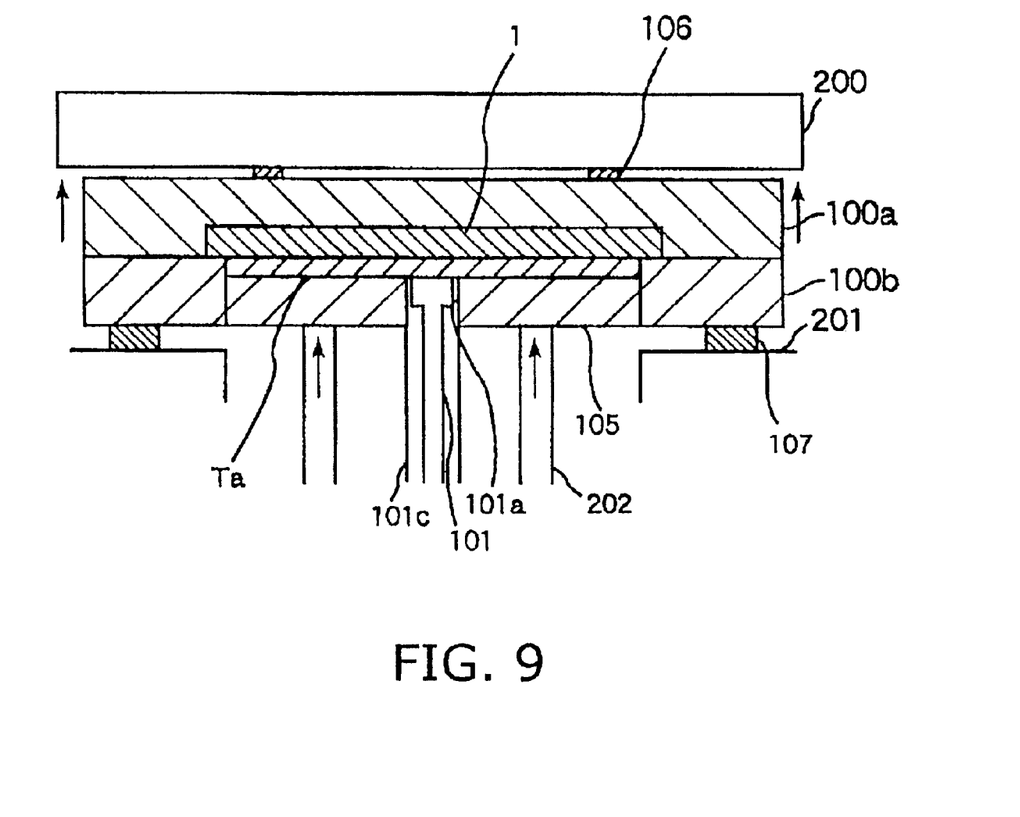

In FIG. 8, the first and second metal molds 100a and 100b are slid upwardly to receive the excessive resin according to the amount of injected resin. As soon as the resin injection by the plunger 101 is completed, a pressure higher than the pressure at the injection time is applied to the piston 202 to close the molds for hardening the molten resin Ta in the cavity to provide an enclosing resin layer (FIG. 9).

According to the second embodiment, the first and second metal molds 100a and 100b are provided in a sliding relationship with the third metal mold 105 so that the first and second metal molds 100a and 100b are slid back with respect to the third metal mold 105 according to the injection of an excessive resin and receive the excessive resin so that the excessive resin spreads over the entire surface of the wafer. As a result, the thickness of the enclosing resin layer increases by 10 um but substantially no projection is produced on the surface of the enclosing resin layer.

Then, the semiconductor wafer substrate 1 is removed from the metal mold 100 and ground to expose the end faces 6a of posts 6. Since there is no projection, breakage of the semiconductor wafer substrate 1 during removal from the metal mold 100 or peeling off of the enclosing resin layer is prevented. Also, breakage of the semiconductor wafer substrate 1 during the grinding is prevented. The increase in the thickness of the enclosing resin layer is so small (tens um) that an increase in the grinding time is sufficiently small to increase the through-put of the process.

Alternatively, the third metal mold 105 may be made movable with respect to the first and second metal molds 100a and 100b that are fixed. In essence, either the first and second metal molds 100a and 100b or the third metal mold 105 is made slidable with respect to the other. The plunger 101 may be replaced by a plurality of plungers provided at positions corresponding to the central area of the semiconductor wafer substrate 1 to inject a resin into the cavity. The above transfer molding technique may be replaced by the injection molding technique using a screw and an injection mechanism.

As has been described above, according to one aspect of the invention, at least one second plunger is provided to absorb an excessive resin flown from the cavity into which resin is injected by the first plunger so that the height of a projection produced on the enclosing resin layer is minimized. The reduced height minimizes not only the breakage of the semiconductor wafer substrate upon release from the metal mold or during grinding but also the peeling off of the enclosing resin layer from the wafer surface. Also, it shortens the time for grinding the projection in the subsequent step, thus increasing the through-put of the process.

According to another aspect of the invention, a slidable unit, which has a surface opposed to a surface of the semiconductor wafer substrate placed in the cavity of a metal mold, is provided such that when it receives an excessive molten resin, it is slid back to absorb it so that it is possible to prevent the production of a projection on the enclosing resin layer. This not only prevents the breakage of the semiconductor wafer substrate upon release from the metal mold or during grinding but also increases the through-put of the process.

What is claimed is:

1. An apparatus for manufacturing a semiconductor device, comprising:

a metal mold consisting of a first metal mold on which a semiconductor wafer substrate is placed, a second metal mold having a cavity, and a third metal mold; and enclosing resin layer forming means for filling said cavity with a molten resin to form an enclosing resin layer on said semiconductor wafer substrate, said enclosing resin layer forming means including:

at least one first plunger provided in said third metal mold for filling said cavity with said molten resin under a predetermined injection pressure;

a surface of said third metal mold being opposed to said semiconductor wafer substrate on said first metal mold; and sliding means for making either said first and second metal molds or said third metal mold slidable with respect to each other under a pressure of said molten resin filled in said cavity, said apparatus further comprising:

a first pressure application means for applying a first pressure higher than a resin pressure of said molten resin to either first and second metal molds or said third metal mold in a first direction opposite to a second direction of said resin pressure; and a second pressure application means for applying a second pressure lower than said resin pressure in said second direction.

2. The apparatus according to claim 1, wherein said first pressure application means comprises a piston to which a pressure higher than said resin pressure is applied.

3. The apparatus according to claim 1, wherein said second pressure application means comprises a spring having a spring pressure lower than said resin pressure.

4. An apparatus for manufacturing a semiconductor device, comprising:

a metal mold consisting of a first metal mold on which a semiconductor wafer substrate is placed, a second metal mold having a cavity, and a third metal mold; and enclosing resin layer forming means for filling said cavity with a molten resin to form an enclosing resin layer on said semiconductor wafer substrate, said enclosing resin layer forming means including:

at least one first plunger provided in said third metal mold for filling said cavity with said molten resin under a predetermined injection pressure;

a surface of said third metal mold being opposed to said semiconductor wafer substrate on said first metal mold; and sliding means for making either said first and second metal molds or said third metal mold slidable with respect to each other under a pressure of said molten resin filled in said cavity, wherein said first plunger is provided at a position corresponding to a central area of said semiconductor wafer substrate.

5. A molding apparatus comprising:

a first mold having a first cavity for supporting a semiconductor wafer therein;

a second mold having a second cavity for injecting a resin therein, a first through hole connected to said second cavity at a central position of said cavity and a second through hole connected to said second cavity at a peripheral position of said second cavity;

a first plunger provided within said first hole for injecting said resin;

a second plunger provided within said second through hole for absorbing said resin overflowed from said second cavity; and a plunger unit connected to said first and second plungers, said plunger unit supplying a first pressure to said first plunger and a second pressure, which is smaller than said first pressure, to said second plunger by a single gauge pressure.

6. The molding apparatus according to claim 5, wherein said plunger unit has a first piston for providing said first pressure to said first plunger and a second piston for providing said second pressure to said second plunger.

7. The molding apparatus according to claim 5, wherein said first plunger has a first bore diameter and said second plunger has a second bore diameter which is larger than said first bore diameter.

8. The molding apparatus according to claim 5, wherein a tablet is placed on said first plunger.

9. The molding apparatus according to claim 5, wherein said first and second through holes are cylindrical holes.

* * * * *